United States Patent Office 3,756,911
Patented Sept. 4, 1973

3,756,911
CARBON-METAL COMPOSITE SLIDE MEMBERS AND METHOD OF MAKING SAME
Toyonosuke Kanemaru, Kanagawa, Hiroshi Yamazoe, Tokyo, and Hiroshi Ichikawa, Kanagawa, Japan, assignors to Nippon Carbon Company Limited, Tokyo, Japan
No Drawing. Filed Dec. 28, 1971, Ser. No. 213,160
Claims priority, application Japan, Dec. 28, 1970, 46/119,939
Int. Cl. C23c 1/10
U.S. Cl. 161—168    8 Claims

ABSTRACT OF THE DISCLOSURE

Carbon-metal composite slide members with an improved dynamic mechanical strength are made out of a finely divided coal of particle sizes of 74 microns or less and of a volatile matter content of 10 to 45%, a fixed carbon content of 50 to 85% and an ash content of 10% or less by molding (hereafter often referred to as compacting) the finely divided coal, sintering the resulting mold (hereafter often referred to as a compact) to form a porous carbonaceous body and impregnating a fused metal or alloy into the porous body to form a carbon-metal composite.

BACKGROUND OF THE INVENTION

This invention relates to a slide member formed of a carbon-metal composite obtained by compacting and sintering a powdered carbon material to form a carbonaceous sintered molding (it will be hereinafter referred to as carbonaceous material) and impregnating the carbonaceous material with a non-ferrous metal and to a method of making the same. In particular, the present invention is concerned with a material to be used as slide members in machinery and tools, especially to a metal-filled carbonaceous material to be used as, e.g., bearings or seals which will, in use, intensively vibrate and rotate at a high speed or bear a shaft rotating at a high speed under a high temperature condition, namely, a carbon-metal composite slide member (hereinafter it will be referred to merely as a slide member), and it is an object of the present invention to provide a slide member which possesses not only excellent abrasion resistance and self-lubricating properties but also a high dynamic mechanical strength which enables the slide member to withstand severe conditions of rotation, shock and vibration.

Carbonaceous material has hitherto been used as various machine parts in virtue of its high thermal resistance, abrasion resistance and corrosion resistance, high thermal conductivity and low thermal expansion coefficient. However, there is a limit in the strength of such carbonaceous materials and the prior carbonaceous materials did not possess a sufficient mechanical strength fitting for use as a machine part, such as a slide member, under severe conditions of use where vibration and impact would be imposed thereupon.

A slide member in a recent highly efficient machine not only slides but also is rotated at high speed or violently vibrated, at times, under a high temperature condition. For instance, such members as, e.g., apex seals in a rotary engine or vanes in a rotary compressor, slide on a slide surface such as, e.g., the inside surface of an engine case while rotating at a high speed and vibrating violently at a high temperature. Accordingly, such slide members are required to possess excellent lubricating properties, abrasion resistance, thermal resistance and other physical and mechanical properties not only under static conditions but also under dynamic conditions and, especially, a dynamic mechanical strength is important. However, prior slide members cannot meet the above requirements in dynamic properties because they have been developed considering various factors under kinetic conditions.

Carbonaceous materials have hitherto been manufactured by blending in a predetermined ratio a carbonaceous raw material consisting of a coal coke, petroleum coke, carbon black, coking coal, anthracite, pre-heated coking coal or anthracite, a mixture thereof and a binder consisting of, e.g., a pitch, tar or synthetic resin, intensively kneading the resulting blend, repulverizing the resulting intimate mixture into a regularized particle size, molding the carbonaceous raw material of a regularized particle size (it will hereinafter be referred to merely as pulverized powder) in a mold and baking the molding in an atmosphere of a non-oxidative gas, such as gaseous nitrogen, in an oven. Known carbon-metal composite slide members for use as sealing or bearing members in machinery and tools have been produced by filling the carbonaceous material with a non-ferrous metal such as, e.g., tin or lead. Such slide members, however, possess a poor abrasion resistance and a trend to pitting (development of numerous pinholes), especially those made out of a petroleum coke as a carbonaceous raw material and a pitch or tar as a binder were poor in abrasion resistance and pitting resistance because of a high volatile matter content of the binder materials.

The poor pitting resistance causes cracking and, finally, breakage of the slide member under dynamic conditions of use and makes it difficult to use the slide member in a machinery or tools in which the slide member will be violently vibrated while rotating at a high speed. This is much more true in the case of recent molded and high-speed internal combustion engines such as rotary engines, rotary compressors and like machines.

Now, as the result of a research for slide members capable of withstanding sliding under severe and violent conditions of high-speed rotation and vibration, we have found that a slide member having a sufficient self-lubricating property and fitting the dynamic conditions of using is obtained by use, as a carbonaceous sintered mold to be filled with a non-ferrous metal, a sintered mold made out of a coal of a volatile matter content of 10 to 45%, a fixed carbon content of 50 to 85% and an ash content of 10% or less, and that a coal of a composition within the above composition ranges has a very good workability without the aid of any binder, probably in virtue of an appropriate content of volatile matter. The mechanical strength of the slide member is enhanced by comminuting the coal to a particle size of 74 microns or less, preferably 44 microns or less. Carbonaceous materials of a composition outside the above range, namely a coal of a volatile matter content of less than 10%, are poor in self-sintering property, and one of a volatile matter content of more than 45% results in a sintered mold deformed by a large extent of expansion and shrinkage during sintering and having a deteriorated mechanical strength. A carbonaceous material made out of a coal of an ash content of more than 10% is apt to injure the opposite slide surface when used as a slide member.

The present invention has been accomplished on the basis of the above discoveries and the slide member of the present invention is characterized in that it consists of a carbonaceous base prepared by molding and sintering a powdered coal of a volatile matter content of 10 to 45%, a fixed carbon content of 50 to 85% and an ash content of 10% or less, preferably 5% or less, and of a particle size of 74 microns or less, preferably 44 microns or less, and an impregnate (hereafter often referred to as an infiltrate material) infiltrated into and solidified in the carbonaceous base and consisting of a low melting non-ferrous metal.

The metal-filled carbonaceous material of the present invention is produced by the following procedure.

First, a coal having a composition within the above range is chosen as a raw material. Bituminous coals of higher degrees of carbonization usually are suitable as a coal in the above composition. The coal is pulverized by means of an impact mill or ball mill to an average particle size of about 150 microns or less and then classified by means of an air sieve classifier to remove coarse particles of +74 microns (200 mesh Tyler) to thereby obtain a homogeneous powdered coal. The powdered coal is then cold pressed by means of, e.g., a hydraulic press into a mold of a desired shape. On this occasion, the cold press preferably is conducted under such conditions as to form a mold which will result in a sintered product of a porosity of 15 to 50%, because a sintered product of a porosity of less than 15% gives a metal-filled product having an insufficient mechanical strength on account of a low metal content and has a trend of pitting while, on the other hand, one of a porosity of more than 50% gives a metal-filled product of a low self-lubricating property by virtue of an excessively high impregnated (often referred to as infiltrated) metal content, causing blocking of the slide member to the slide surface. From this point of view, a molding pressure within the range of 0.5 to 2 tons/cm.$^2$ is preferred. The molding thus obtained is then sintered, preferably in two stages as illustrated in detail hereinafter.

The first stage is for carbonization of the mold, so that it is preferred to conduct the first sintering under relatively mild conditions, because a rapid carbonization in the carbonaceous base of the present invention hinders flow of a large quantity of volatile matter contained therein to cause cracking resulting from differences in thermal expansibility between the volatile matter and the fixed carbon (including other non-volatile matters) and hinders the volatile matter flow throughout the compact, whereby the function of the volatile matter as a binder is not fully developed.

It is preferred to conduct the first sintering in an inert gas, such as nitrogen or argon, to prevent oxidation and to raise the temperature at a rate of 5 to 10° C./hr. to 200° C., 1 to 2° C./hr. to 500° C. and 10 to 25° C./hr. to 900° C. In this stage, the temperature rise between 200° C. and 500° C. should be carefully controlled since within this temperature range the flow of volatile matter is most vigorous and the properties of the final product of the present invention are influenced to the largest extent by the working conditions within this temperature range.

The compact which has been subjected to the first sintering under the above conditions is then subjected to a second sintering which is for enhancement of the mechanical strength of the compact.

The second sintering is conducted at a rate of temperature rise of 20 to 30° C./hr. and at a maximum temperature of 1,200 to 1,400° C. Within this temperature range of sintering the hardness and strength of carbon take the highest values to give a material of the present invention of a good quality.

The first and second sintering, as mentioned above, may be conducted successively.

The sintered compact thus obtained is excellent in strength and hardness and has a porosity of 15 to 50% and may be strengthened in the following infiltrating step by impregnating well with a low melting non-ferrous metal.

The sintered compact thus obtained is then impregnated or filled with a low melting non-ferrous metal or alloy. The non-ferrous metal or alloy should be selected according to the properties to be imparted to the resulting composite and may be selected from a variety of non-ferrous metals and alloys, though, usually, there is used one of a melting point within the range of 200° C. and 1,100° C. Accordingly, as the non-ferrous metal or alloy there are conveniently used, e.g., Al and Al-Cu, Al-Mg, Al-Si, Al-Sn, Al-Zn, Al-Cu-Mg, Al-Cu-Si, Al-Mg-Si, Al-Zn-Mg and like Al-alloys; Cu and Cu-Be, Cu-Mg, Cu-Mn, Cu-Pb, Cu-Si, Cu-Sn, Cu-Zn, Cu-Zn-Sn, Cu-Sn-P, Cu-Sn-Pb, Cu-Sn-Ni, Cu-Pb-Si, Cu-Ni-Si and like Cu-alloys; Zn and Zn-Al-Cu and like Zn-alloys; Pb and Pb-Cd and like Pb-alloys; Sn and Sn-Zn, Sn-Sb, Sn-Pb, Sn-Pb-Sb (white metal) and like Sn-alloys; Ag-Al, Ag-Cu, Ag-Pb, Ag-Sn, Ag-Zn and like Ag-alloys.

In the metal-filling or impregnating step, the sintered compact is put under a reduced pressure, preferably of 5 to 0.5 torr, to eliminate gases contained in the pores and, subsequently, the evacuated sintered compact is soaked in a fused non-ferrous metal or alloy bath to infiltrate the metal or alloy into the compact. The metal-filling may be attained by introducing a pressurized non-oxidative gas (nitrogen or like inert gas) over the fused metal or alloy to apply thereto a pressure of about 50 to 150 atmospheres to aid impregnation of the fused metal or alloy into the pores of the sintered compact.

In order to obtain a slide member of a good quality which possesses a sufficient mechanical strength and a high pitting resistance and reduced trend for blocking, at least 80% of the pores in the sintered compact should be filled up with the metal or alloy.

Example 1

A bituminous coal of a volatile matter content of 42.5%, a fixed carbon content of 51.3% and an ash content of 3.2% was selected, dried, pulverized and classified to recover a powdered coal of particle sizes of 44 to 10 microns. The powdered coal was compacted in a vertical press under a pressure of 1.0 ton/cm.$^2$ into a compact of 100 mm. x 100 mm. x 25 mm. The compact was then gradually heated and baked at a maximum temperature of 900° C. for 2 hours in an atmosphere of gaseous nitrogen and subsequently baked at 1,350° C. for about 2 hours in a direct resistance electric furnace. From a number of sintered compacts thus obtained, one of a porosity of 35% was selected and the sintered compact was kept for 1 hour under a reduced pressure of 5 torr in an autoclave and then soaked in a fused Al-Si alloy bath at 750° C. for 5 minutes under a pressure of 50 kg./cm.$^2$ to fill up 98% of the pores in the sintered compact with the alloy. The metal-filled sintered compact was taken out of the bath and was cut into 10 pieces of the material of the present invention each being 8 mm. x 15 mm. x 65 mm. The material was subjected to determination of properties and the results were as summarized in the table.

Example 2

A bituminous coal of a volatile matter content of 19.8%, a fixed carbon content of 72.1% and an ash content of 5% was pulverized in the similar manner as in Example 1 and classified into a fraction of particle sizes of 74 to 5 microns. The powdered coal was pressed under a pressure of 2.0 tons/cm.$^2$ into a compact of 100 mm. x 100 mm. x 25 mm. The compact was baked under the same conditions as in Example 1 and a sintered compact of a porosity of 38% was selected. The sintered compact was treated in an autoclave under the same conditions as in Example 1, soaked in a Cu-Al alloy bath under the same conditions as in Example 1 and cut into 9 pieces of the material of the present invention each of 8 mm. x 15 mm. x 65 mm. The average properties of the material were as summarized in the following table.

Examples 3 to 7

Separate pieces of the same carbonaceous sintered compact as in Example 1 were soaked in an Al bath (750° C.), Al-Cu-Si bath (1,000° C.), Cu-Pb-Si bath (900° C.), Pb-Sb bath (310° C.) or Sb-Sn bath (550° C.) in a manner similar to Example 1 to produce specimens. The properties of the specimens were as summarized in the following table.

Examples 8 to 9 (conventional products)

Conventional carbonaceous materials of a porosity of 17 or 31% prepared by molding and baking a mixture of a powdered petroleum coke and a pitch and tar as a binder were filled up with a Sb-Sn alloy as was used in Example 7 or an Al-Si alloy as used in Example 1. The carbonaceous material of a porosity of 17% was filled up with the Sb-Sn alloy so that 90% of its pores were filled up, and the latter with the Al-Si alloy so that 98% of its pores were filled up, as in Example 1. The properties of the resulting metal-filled carbonaceous materials were as summarized in the following table.

Examples 10 to 12 (comparative examples)

From the sintered compacts prepared from the same coal in the same procedure as in Example 1 were selected ones of porosities of 10, 60 and 40%, respectively. The sintered compacts were filled up with an Al-Si alloy bath at 750° C. so that, in the case of the sintered compact of the porosity of 10%, 98% of its pores were filled up, in the case of the sintered compact of the porosity of 60%, 90% of its pores were filled up and, in the case of the sintered compact of the porosity of 40%, 70% of its pores were filled up. All the metal-filled sintered compacts were worked in a manner similar to Example 1 to form test pieces. The properties determined on the test pieces were as summerized in the following table.

| Example number | 1 | 2 | 3 | 4 | 5 | 6 | 7 | 8 | 9 | 10 | 11 | 12 |
|---|---|---|---|---|---|---|---|---|---|---|---|---|
| Fulk specific gravity | 2.03 | 3.83 | 1.93 | 2.02 | 3.64 | 2.93 | 3.12 | 2.55 | 2.17 | 1.78 | 2.14 | 1.78 |
| Blexural strength (kg./cm.$^2$) | 2,500 | 2,200 | 2,400 | 2,800 | 1,500 | 1,000 | 1,100 | 1,200 | 1,700 | 1,500 | 2,800 | 1,200 |
| Specific conductivity ($\times 10^{-5}$ $\omega$-cm.) | 30 | 15 | 40 | 10 | 50 | 80 | 60 | 90 | 100 | 200 | 5 | 10 |
| Thermal expansion coefficient ($\times 10^{-6}$/° C.) | 6 | 7 | 6 | 7 | 6 | 6 | 6 | 6 | 6 | 6 | 12 | 6 |
| Abrasion loss ($\mu$) [1] | 1.5 | 1.1 | 1.3 | 1.5 | 1.2 | 1.0 | 1.0 | 3.3 | 2.8 | 0.8 | ([2]) | 5.5 |
| Degree of pitting [3] | 0 | 1 | 1 | 0 | 0 | 1 | 1 | 4 | 3 | 4 | 1 | 0 |
| Infiltrated metal | Al-Si | Cu-Al | Al | Al-Cu-Si | Cu-Pb-Si | Pb-Si | Pb-Sn | Sb-Sn | Al-Si | Al-Si | Al-Si | Al-Si |
| Porosity of sintered compact (percent) | 35 | 38 | 30 | 45 | 26 | 15 | 18 | 17 | 31 | 10 | 60 | 40 |
| Percentage of pores filled up with metal | 98 | 85 | 93 | 90 | 95 | 91 | 88 | 90 | 98 | 93 | 90 | 70 |

[1] The abrasion test was as follows: A hard chromium plated steel drum of 300 mm. $\varphi$ was revolved at a peripheral speed of 7.1 m./sec. and a rounded end of a specimen (thickness 8 mm. x height 15 mm. x length 65 mm., edges of one end of which were rounded with a radius of 4 mm.) was pressed against the peripheral surface of the revolving drum under a spring load of 40 kg. while continuously feeding a lubricating oil, Mobile # 40 oil, to the slide surface for a period of 1,400 minutes, and the maximum abrasion loss in height was determined by means of a micrometer ($\times 1,000$).
[2] Blocked.
[3] State of development of pinholes on the abrasion surface of a specimen after the abrasion test was observed with the naked eye and the result was estimated with 6 steps of numerical values from 0 (no pitting was observed) to 6 (assemblies of pinholes were forming crater-like recesses).

It will be noticed from the above table that the abrasion loss of the material of the present invention is about ½ times that of the conventional product, that is, the material of the present invention is superior in abrasion resistance. The material of the present invention is superior also in pitting resistance as indicated by the comparison of the states of the abrasion of slide surfaces. It will also be noticed from the above table that a slide member made out of a sintered compact of a porosity of less than 15% develops heavy pitting, one made out of a sintered compact of a porosity of more than 50% causes blocking and one having a metal filling percentage (percentage of pores filled up with a metal) of less than 80% is heavily worn out.

As mentioned above, the material of the present invention is an ideal slide member having excellent mechanical strength, abrasion resistance, pitting resistance and thermal resistance.

What we claim is:

1. A carbon-metal composite slide member consisting of a carbonaceous sintered compact obtained by compacting and sintering a powdered coal of a volatile matter content of 10 to 45%, a fixed carbon content of 50 to 85% and an ash content of 10% or less and particle sizes of 74 microns or less and a non-ferrous metal or alloy infiltrated into the carbonaceous sintered compact.

2. The slide member as defined in claim 1 in which the porosity of the carbonaceous sintered compact is 15 to 50%.

3. The slide member as defined in claim 1 in which the non-ferrous metal or alloy is a member of the group consisting of Al, Zn, Cu, Al-Cu, Al-Mg, Al-Mn, Al-Si, Al-Zn, Al-Cu-Mg, Al-Cu-Si, Al-Zn-Mg, Cu-Be, Cu-Mg, Cu-Mn, Cu-Pb, Cu-Si, Cu-Zn, Cu-Zn-Sn, Cu-Sn-P, Cu-Sn, Cu-Sn-Pb, Cu-Sn-Ni, Cu-Pb-Si, Cu-Ni-Si, Zn-Al, Zn-Cu, Zn-Al-Cu, Sn-Zn, Sn-Al, Sn-Pb, Sn-Pb-Sb, Sn-Sb-Cu, Pb-Cd, Pb-Sb-Sn, Ag-Al, Ag-Cu and Ag-Sn.

4. A method of producing carbon-metal composite slide members comprising compacting under a pressure of 0.5 to 2 tons/cm.$^2$ a powdered coal of a volatile matter content of 10 to 45%, a fixed carbon content of 50 to 85% and an ash content of 10% or less and of particle sizes of 74 microns or less without use of any binder, baking the resulting compact first at 200 to 900° and then at 1200 to 1400° C. and infiltering a non-ferrous metal or alloy into the sintered compact.

5. The method as defined in claim 4 in which the non-ferrous metal or alloy is a member of the group consisting of Al, Zn, Cu, Al-Cu, Al-Mg, Al-Mn, Al-Si, Al-Sn, Al-Zn, Al-Cu-Mg, Al-Cu-Si, Al-Mg-Si, Al-Zn-Mg, Cu-Be, Cu-Mg, Cu-Mn, Cu-Pb, Cu-Si, Cu-Zn, Cu-Zn-Sn, Cu-Sn-P, Cu-Sn, Cu-Sn-Pb, Cu-Sn-Ni, Cu-Pb-Si, Cu-Ni-Si, Zn-Al, Zn-Cu, Zn-Al-Cu, Sn-Zn, Sn-Al, Sn-Pb, Sn-Pb-Si, Sn-Pb-Sb, Sn-Sb-Cu, Pb-Cd, Pb-Sb-Sn, Ag-Al, Ag-Cu and Ag-Sn.

6. The method as defined in claim 4 in which a sintered compact of a porosity of 15 to 50% is selected and the sintered compact is filled up with a non-ferrous metal or alloy.

7. The method as defined in claim 4 in which, in the first stage of baking, the temperature is raised at a rate of 5 to 10° C./hour to 200° C. at a rate of 1 to 2° C./hour to 500° C. and at a rate of 10 to 25° C./hour to 900° C.

8. The method as defined in claim 4 in which, in the second stage of baking, the temperature is raised at a rate of 20 to 30° C./hour.

References Cited

UNITED STATES PATENTS 3,227,519    4/1969    Baker    117—160 R
3,664,865    5/1972    Lanza    117—160 R WILLIAM J. VAN BALEN, Primary Examiner U.S. Cl. X.R.

117—160 R, DIG. 11